United States Patent [19]

Takemoto et al.

[11] Patent Number: 5,065,246
[45] Date of Patent: Nov. 12, 1991

[54] FOCUSING SYSTEM AND IMAGE INPUT APPARATUS HAVING AUTOMATIC FOCUSING SYSTEM WHICH USES DIGITAL PROCESSING

[75] Inventors: Hiroshi Takemoto, Yokohama; Noboru Murayama, Machida; Kei Sato, Atsugi, all of Japan

[73] Assignee: Ricoh Company, Ltd., Japan

[21] Appl. No.: 550,431

[22] Filed: Jul. 10, 1990

[30] Foreign Application Priority Data

Jul. 24, 1989 [JP] Japan .................................. 1-190804

[51] Int. Cl.$^5$ ............................................. H04N 5/232
[52] U.S. Cl. .................................... 358/227; 358/228; 358/209; 358/909
[58] Field of Search ............... 358/227, 228, 209, 135, 358/136, 909, 462, 261.3, 261.2, 261.1; 382/56; 354/400, 402, 421

[56] References Cited

U.S. PATENT DOCUMENTS

| | | |
|---|---|---|
| 4,541,010 | 9/1985 | Alston .................................... 358/44 |
| 4,544,953 | 10/1985 | Goldman ............................. 358/227 |
| 4,969,045 | 11/1990 | Haruki et al. . |

FOREIGN PATENT DOCUMENTS 54-139422 10/1979 Japan .
56-158583 12/1981 Japan .
57-28480 2/1982 Japan .
62-264774 11/1987 Japan .
62-269581 11/1987 Japan .
63-146583 6/1988 Japan .
63-174476 7/1988 Japan .
64-16177 1/1989 Japan .

OTHER PUBLICATIONS

"An Automatic Focal Adjustment in Television Camera Using Mountain-Climbing Servo System," NHK Technical Report, vol. 17, No. 1, 1965, pp. 21–37, No English Translation.

Hideo Toyoda et al., "New Automatic Focusing System for TV Cameras," Television Society Technical Report, pp. 7–12, No English Translation.

Hideo Toyoda et al., "New Automatic Focusing System for TV Cameras," Television Society Technical Report, pp. 39–44, No English Translation.

Hirotugu Murashima et al., "Automatic Focusing for Video Cameras Using Digital Integration," Research Center of Sanyo Electric Co., Ltd., pp. 13–18, No English Translation.

Primary Examiner—Howard W. Britton
Assistant Examiner—Tuan V. Ho
Attorney, Agent, or Firm—Mason, Fenwick & Lawrence

[57] ABSTRACT

An automatic focusing system includes an image pickup system for picking up an image and for outputting an image signal, a compression part for digitally compressing the image signal from the image pickup system and for outputting a compressed image signal, an operation part for obtaining focal information by carrying out a digital operation on the compressed image signal, and an adjusting part responsive to the focal information for automatically adjusting a focal point of the image pickup system to an in-focus position.

15 Claims, 10 Drawing Sheets

FOCUSING SYSTEM AND IMAGE INPUT APPARATUS HAVING AUTOMATIC FOCUSING SYSTEM WHICH USES DIGITAL PROCESSING

BACKGROUND OF THE INVENTION

The present invention generally relates to focusing systems and image input apparatuses having a focusing system, and more particularly to an automatic focusing system and an image input apparatus which has such an automatic focusing system.

Apparatuses for transmitting images are realized by videophones and the like. However, an image input apparatus which is provided in such apparatuses generally does not have a high performance. In most cases, a pan focus camera having a focusing system is used as the image input apparatus. The image input apparatus having the focusing system is also used in video cameras.

Presently, a so-called mountain-climbing system is most popularly used as a system of obtaining focal information. The mountain-climbing system is proposed in "Automatic Focal Adjustment in Television Camera Using Mountain-Climbing Servo System", NHK Technical Report, Vol. 17, No. 1, pp. 7-12, 1965. According to this system, the focal information is obtained by use of an image signal which is output from an image pickup element. The existing focal system uses a bandpass filter to extract a high-frequency component which is included in the image signal, and the signal is generally processed in the analog form. In addition, a plurality of kinds of bandpass filters are used to exclude false information from the focal information. The use of the plurality of kinds of bandpass filters is proposed for example in a Japanese Laid-Open Patent Application No. 64-16177 and "New Automatic Focusing System", Television Society Technical Report.

On the other hand, there is a proposed electronic still camera which includes an image pickup element for subjecting the image into a photoelectric conversion, an analog-to-digital converter for converting an output image signal of the image pickup element into a digital image signal, and a memory for storing the output digital image signal of the analog-to-digital converter. The digital image signal is read out from the memory and a corresponding image is displayed on a television monitor or the like. Such an electronic still camera is proposed in Japanese Laid-Open Patent Applications No. 54-139422, No. 56-158583, No. 57-28480, No. 62-269581 and No. 63-146583.

The focal system of the image input apparatuses described above uses parts exclusively for the focal system, and the number of parts required in the focal system is large. In addition, because all signals are processed in the analog form, the accuracy of the focal system is poor. Moreover, the use of the plurality of kinds of bandpass filters also increases the number of parts required in the focal system.

On the other hand, the electronic still camera stores in the memory only the image signal which is obtained from the image pickup element. For this reason, it may take a long time to find an image picked up several years ago because the user must depend on his memory. In addition, there is no means of knowing who and when each image stored in the memory was actually taken.

SUMMARY OF THE INVENTION

Accordingly, it is a general object of the present invention to provide a novel and useful automatic focal system and an image input apparatus having the automatic focal system, in which the problems described above are eliminated.

Another and more specific object of the present invention is to provide an automatic focusing system comprising an image pickup system for picking up an image and for outputting an image signal, compression means for digitally compressing the image signal from the image pickup system and for outputting a compressed image signal, operation means for obtaining focal information by carrying out a digital operation on the compressed image signal, and adjusting means responsive to the focal information for automatically adjusting a focal point of the image pickup system to an in-focus position. According to the automatic focusing system of the present invention, the accuracy of the automatic focusing is improved because of the digital operation carried out in the operation means, and the number of required parts is small.

Still another object of the present invention is to provide an image input apparatus having an automatic focusing system, which image input apparatus comprises an image pickup system for picking up an image and for outputting an image signal, compression means for digitally compressing the image signal from the image pickup system and for outputting a compressed image signal, switching means for outputting a high-frequency component of the compressed image signal in a first mode and for outputting a low-frequency component of the compressed image signal in a second mode, operation means for obtaining focal information by carrying out a digital operation on the compressed image signal including the high-frequency component from the switching means in the first mode, adjusting means responsive to the focal information for automatically adjusting a focal point of the image pickup system to an in-focus position, and transfer means for transferring the compressed image data including the low-frequency component from the switching means in the second mode, where the image pickup system, the compression means, the operation means and the adjusting means form the automatic focusing system. According to the image input apparatus of the present invention, the accuracy of the automatic focusing is improved because of the digital operation carried out in the operation means, and the number of parts required for the automatic focusing system is small.

A further object of the present invention is to provide an image input apparatus of the above described type in which there are further provided adding means coupled to the compression means for adding additional information to the compressed image signal from said compression means. The additional information may be, for example, data for use in making a search and date and time information. According to the image input apparatus of the present invention, it is possible to search and find a desired image in a short time based on the additional information.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIGS. 1 and 2.

Figure 1:
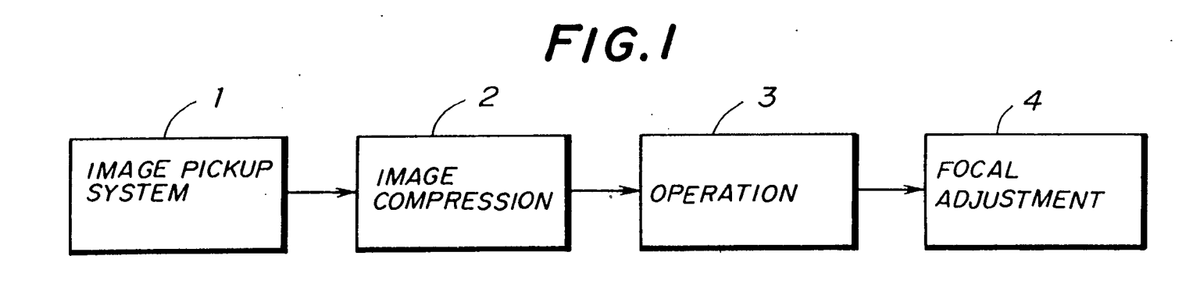
FIGS. 1 and 2 are system block diagrams for explaining the operating principle of the present invention.

According to one aspect of the present invention, an image compression means 2 shown in FIG. 1 receives an image signal from an imaging system 1. A calculation means 3 calculates focal information of the imaging system 1 based on a compressed image signal which is received from the image compression means 2. A focal adjustment means 4 adjusts a focal point of the imaging system 1 based on the focal information which is received from the calculation means 3.

Figure 2:
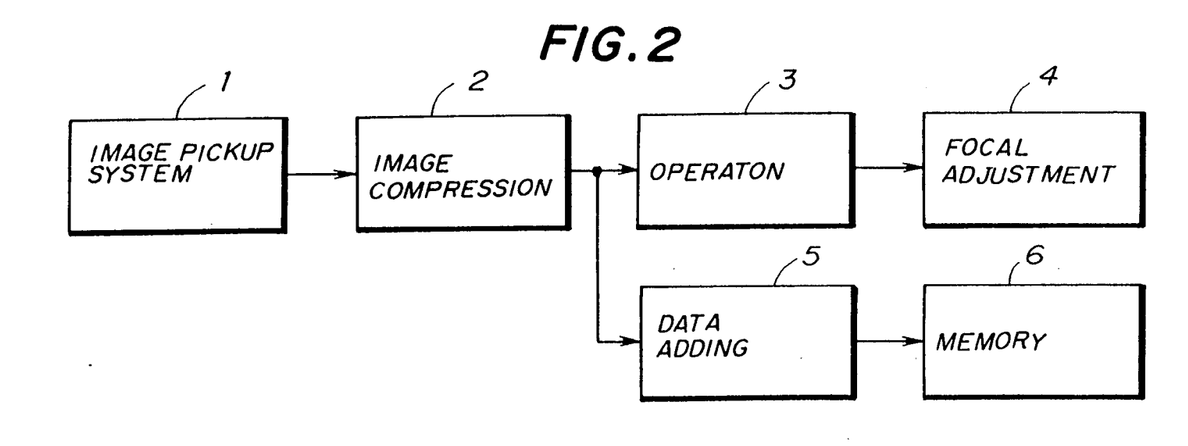

In FIG. 2, those parts which are the same as those corresponding parts in FIG. 1 are designated by the same reference numerals, and a description thereof will be omitted. According to another aspect of the present invention, a data adding means 5 adds to the compressed image signal from the image compression means 2 data for use in making a search, date information and the like. A memory 6 stores the signal received from the data adding means 5.

In an image transmission/storage apparatus which transmits images or stores images in a memory, it is necessary to provide an image compression means for compressing the image data so as to process the image at a reasonable speed and to cope with the limited memory capacity. Recently, digital signal processors are being developed exclusively for use in the image compression means. The methods of compressing the image data by an image coding are developed with the aim of improving the efficiency of image transmission or storage, and these methods are directly applicable to the focal system. When an image is subjected to a frequency conversion, virtually all image information can be described by a D.C. component and a low-frequency component. Hence, the image coding is considered most effective at the present when only the low-frequency component of the image is processed and the high-frequency component is omitted.

When observing the focal state in the image input apparatus, the high-frequency component of the output image signal of the image pickup system is observed. This is because a large number of high-frequency components is included in an in-focus image which includes a large number of sharp edges. The frequency components of the image signal output from the image pickup system are measured in the image input apparatus while turning a focusing ring, and the in-focus state is obtained when the focusing ring is stopped at a position where a maximum number of high-frequency components are included in the frequency components. Accordingly, when the low-frequency component of the image is extracted for the imaging coding immediately before the image transmission and the high-frequency component of the image is otherwise extracted for the focal adjustment, it is possible to realize an image transmission apparatus which has an image input apparatus capable to constantly and automatically adjusting the focus.

Figure 3:
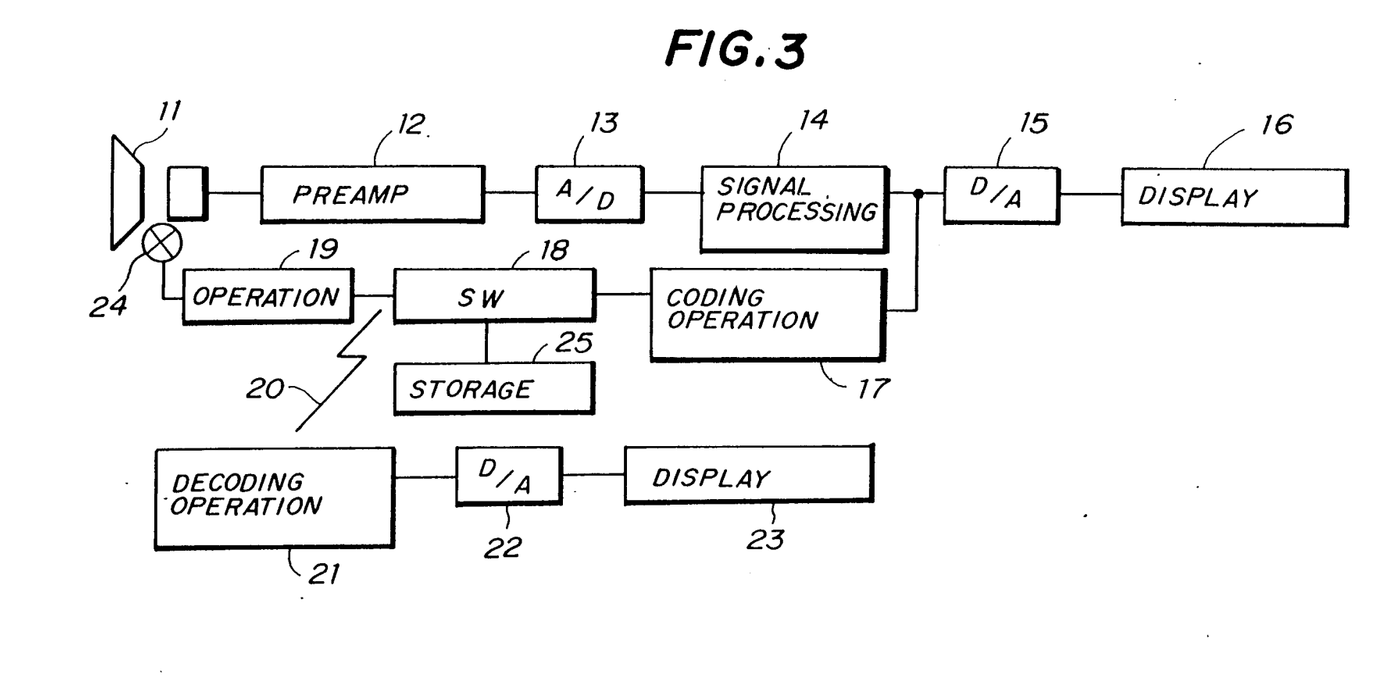
FIG. 3 is a system block diagram showing a first embodiment of an image input apparatus according to the present invention.
Figure 4:
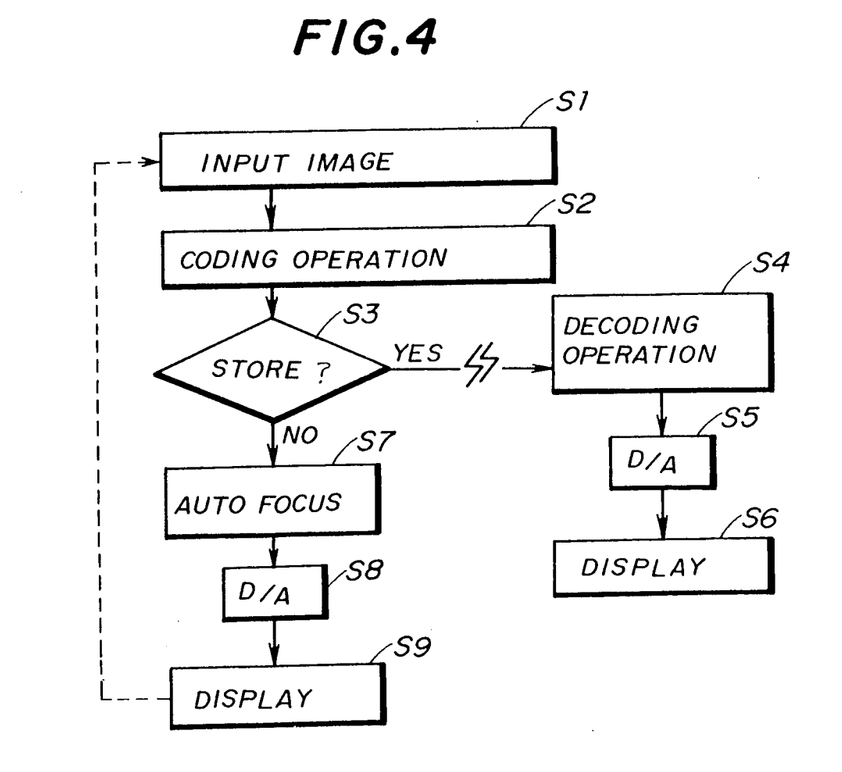
FIG. 4 is a flow chart for explaining an operation of a part of the block system shown in FIG. 3.

The embodiments of the present invention are based on the above described principle. FIG. 3 shows a first embodiment of an image input apparatus according to the present invention applied to an image transmission/storage apparatus. FIG. 4 is a flow chart for explaining an operation of a part of the block system shown in FIG. 3.

In FIG. 3, an image pickup system 11 picks up an image and outputs an analog image signal. This analog image signal is amplified in a preamplifier 12 and is subjected to an analog-to-digital (A/D) conversion in an analog-to-digital (A/D) converter 13. A signal processing circuit 14 carries out a predetermined signal processing on the digital image signal which is received from the A/D converter 13. For example, the signal processing circuit 14 processes the output digital image signal of the A/D converter 13 into digital red, green and blue signals R, G and B. A digital-to-analog (D/A) converter 15 converts the digital image signal from the signal processing circuit 14 into an analog image signal, and a display device 16 displays an image dependent on the analog image signal.

The digital image signal from the signal processing circuit 14 is also supplied to a coding operation part 17. For example, the coding operation part 17 includes a discrete cosine transform circuit which compresses the digital image signal by subjecting the digital image signal to a discrete cosine transform. An output image signal of the coding operation part 17 is supplied to a switching circuit 18. In an automatic focusing mode, the switching circuit 18 supplies a high-frequency component of the image signal which is received from the coding operation part 17 to an operation part 19. The mode of the switching circuit 18 is switched to an image storage mode or an image transmission mode by an interrupt when there is an image storage request or an image transmission request. In the image storage mode, the switching circuit 18 supplies a low-frequency component of the image signal which is received from the coding operation part 17 to a storage device (memory) 25. In the image transmission mode, the switching circuit 18 supplies the low-frequency component of the image signal which is received from the coding operation part 17 to a transmission path 20.

The image signal which is transmitted via the transmission path 20 in the image transmission mode is decoded in a decoding operation part 21 and is returned to the digital image signal before the compression. The decoded image signal is converted into an analog image signal in a D/A converter 22, and a display device 23 displays an image dependent on the analog image signal.

The operation part 19 carries out an operation to obtain a focal information which indicates the focal state of the image pickup system 11 based on the image signal which is received from the switching circuit 18 in the automatic focusing mode. A motor controller 24 drives a motor (not shown) responsive to the focal information which is received from the operation part 19 so as to move a lens of the image pickup system 11 and adjust the focal point to a in-focus position. The high-frequency component of the image signal which is supplied from the coding operation part 17 to the operation part 19 via the switching circuit 18 may be set arbitrarily so as to include desired frequencies depending on the image or conditions.

FIG. 4 generally shows the operation of this embodiment. In FIG. 4, a step enters the image via the image pickup system 11. A step S2 codes the image signal in the coding operation part 17, and a step S3 discriminates whether or not the mode of the switching circuit 18 is set to the image transmission mode. When the discrimination result in the step S3 is YES, the image signal is transmitted via the transmission path 20 and a step S4 decodes the image signal in the decoding operation part 21. A step S5 subjects the image signal to a D/A conversion in the D/A converter 22, and a step S6 displays the image on the display device 23 based on the image signal.

On the other hand, when the discrimination result in the step S3 is NO, a step S7 makes an automatic focusing using the operation part 19 and the motor controller 24. A step S8 subjects the image signal from the signal processing circuit 14 to a D/A conversion in the D/A converter 15, and a step S9 displays the image on the display device 16 based on the image signal.

Figure 5:
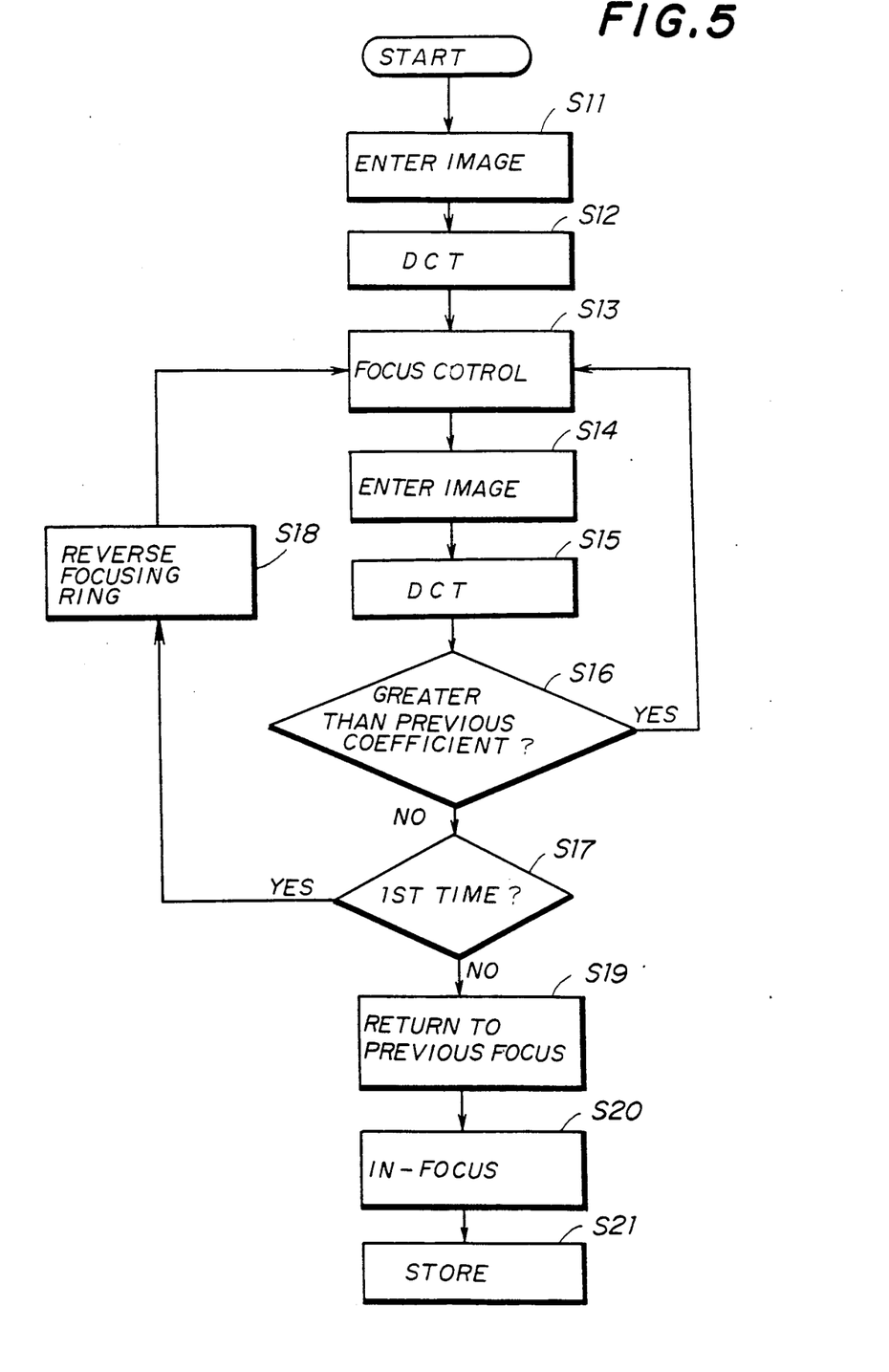
FIG. 5 is a flow chart for explaining an operation of a switching circuit shown in FIG. 3 in more detail.

FIG. 5 shows the operations of the switching circuit 18 in more detail. In FIG. 5, a step S11 enters the image signal from the coding operation part 17, and a step S12 reads the coding coefficient of the discrete cosine transform. A step S13 carries out a focal adjustment via the operation part 19 and the motor controller 24 based on the read coding coefficient. A step S14 enters the image signal from the coding operation part 17, and a step S15 reads the coding coefficient. A step S16 discriminates whether or not the present coding coefficient is greater than the previous coding coefficient. The process returns to the step S13 when the discrimination result in the step S16 is YES. On the other hand, when the discrimination result in the step S16 is NO, a step S17 discriminates whether or not it is the first time the discrimination result in the step S16 is NO. When the discrimination result in the step S17 is YES, a step S18 turns the focusing ring in the reverse direction and the process returns to the step S13. When the discrimination result in the step S17 is NO, a step S19 returns the focusing ring to the previous position. A step S20 sets the in-focus state and a step S21 stores the image signal in the storage device 25.

Figure 6:
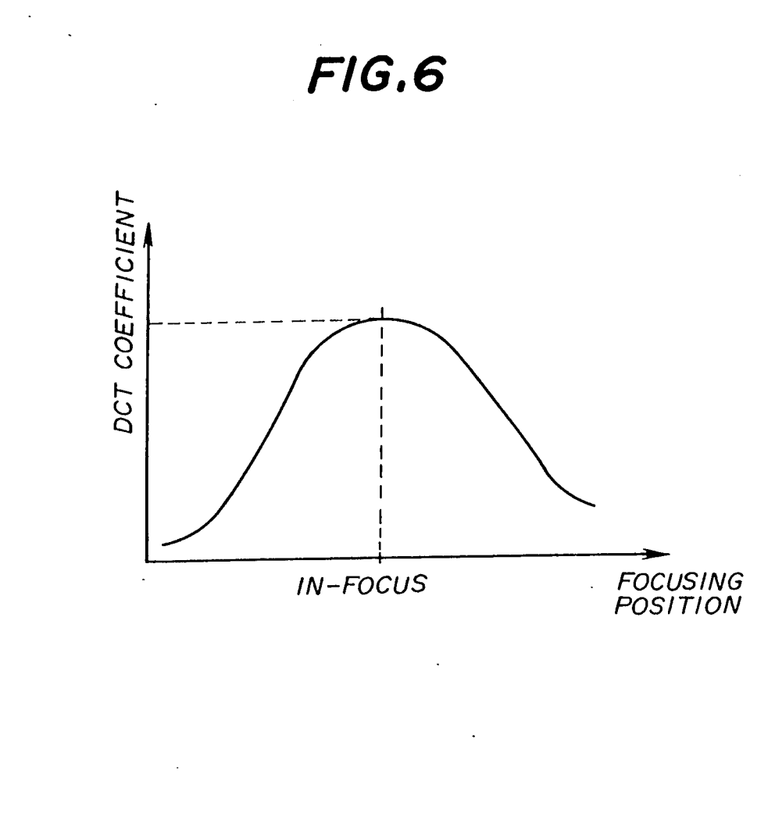
FIG. 6 shows a relationship between the coding coefficients and the focus.

In other words, the process shown in FIG. 5 searches for a peak of the mountain in FIG. 6 which shows the relationship between the coding coefficient and the focus. The step S17 discriminates whether or not it is the first time the discrimination result in the step S16 is NO, so as to take into account a case where the focal adjustment is made in a reverse (wrong) direction at the start. When the position passes the peak of the mountain and begins to descend, it is judged that the previous position corresponds to the in-focus state, and the storage of the image signal starts from this position.

In the image transmission/storage apparatus shown in FIG. 3, the image input apparatus includes the image pickup system 11, the preamplifier 12, the A/D converter 13, the signal processing circuit 14, the coding operation part 17 and the focusing system. However, the focusing system uses the A/D converter 13, the signal processing circuit 14 and the coding operation part 17 and is made up of these elements and the operation part 19 and the motor controller 24. For this reason, the number of parts required to form the focusing system is small. In addition, it is possible to improve the accuracy of the automatic focusing because the focusing system calculates the focal information from the high-frequency component of the digital image signal which is obtained from the coding operation part 17 via the switching circuit 18 and the image pickup system 11 is adjusted based on this focal information.

In a modification of this embodiment, the coding operation part 17 uses an adaptive discrete cosine transform circuit.

In this embodiment and the modification thereof, it is possible to reduce the number of parts of the focal system because the coding operation part 17 uses the discrete cosine transform circuit or the adaptive discrete cosine transform circuit and these circuits can be realized by use of a digital signal processor which is developed exclusively for use in the coding operation means.

In this embodiment, a video camera can be realized by omitting the transmission path 20, the decoding operation part 21, the D/A converter 22 and the display device 23 in FIG. 3. In addition, an image transmission apparatus can be realized by omitting the storage device 25 in FIG. 3.

Figure 7:
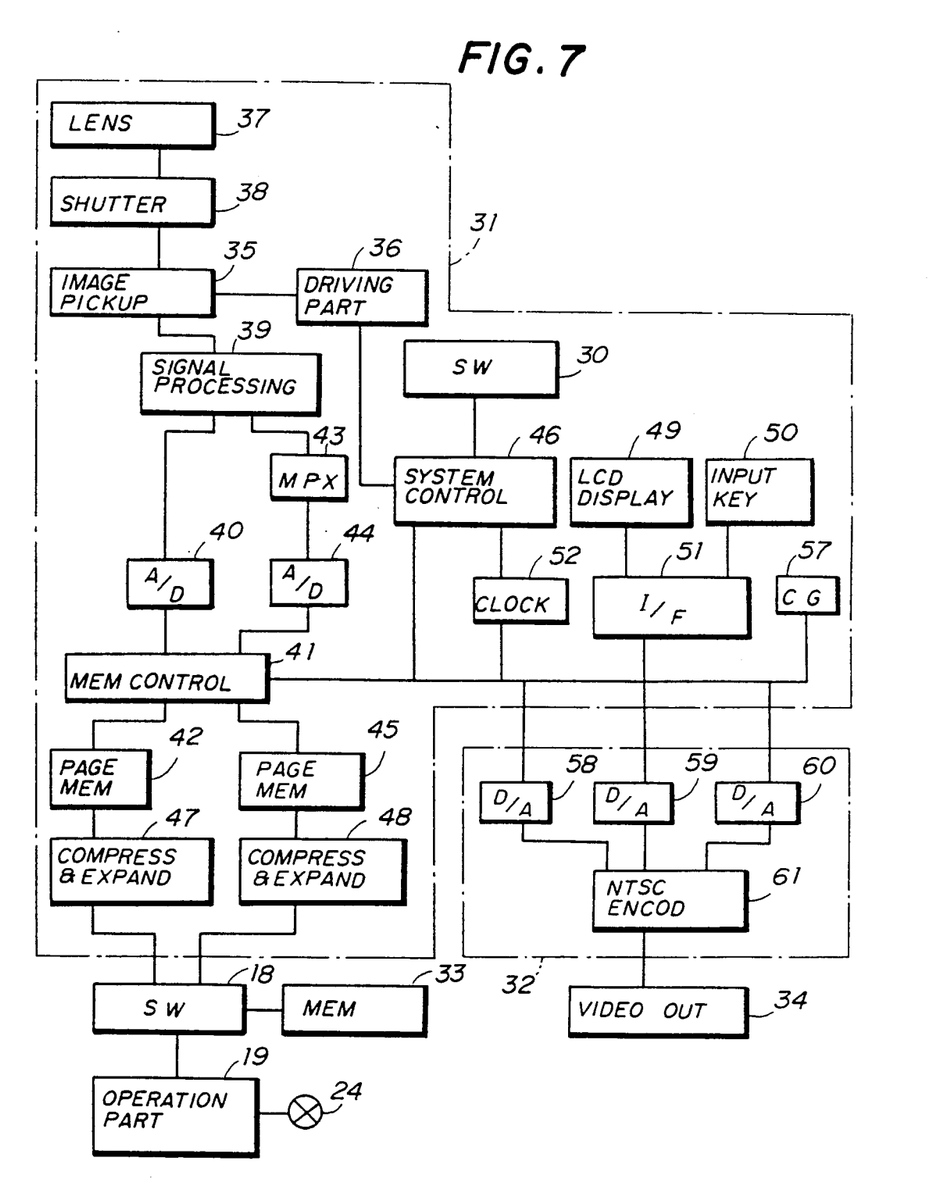
FIG. 7 is a system block diagram showing a second embodiment of the image input apparatus according to the present invention.
Figure 8A:
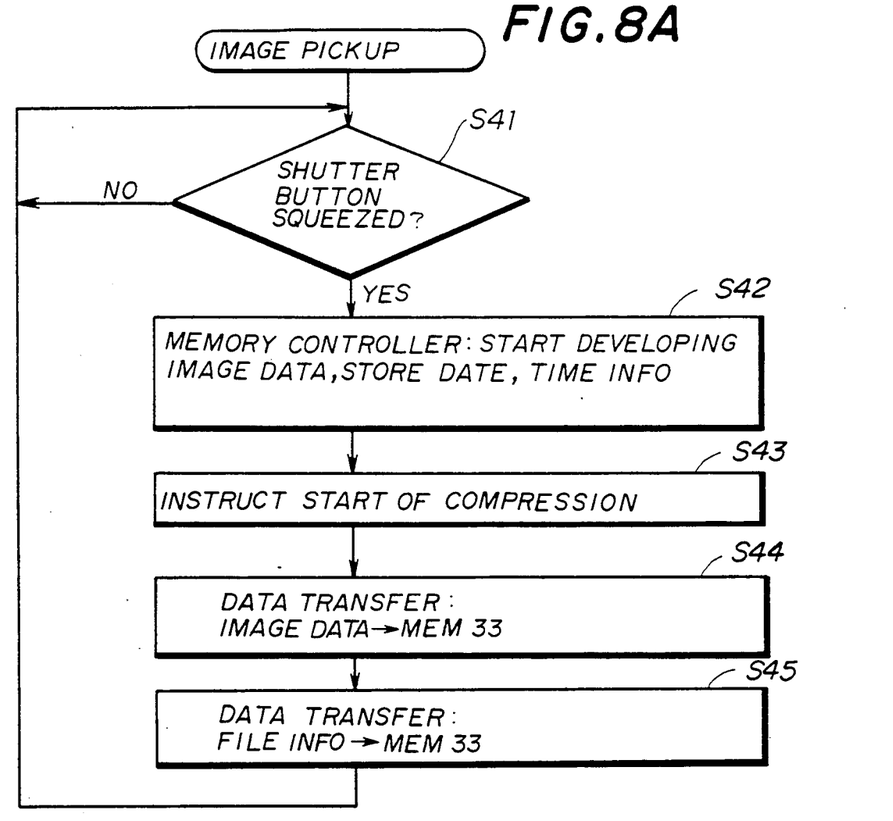
FIGS. 8A and 8B are flow charts for explaining an operation of a system controller shown in FIG. 7.
Figure 8B:
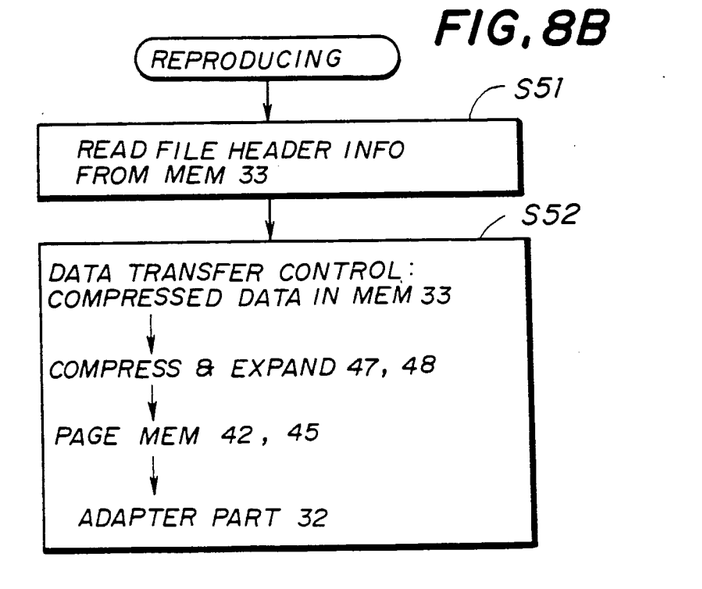

Next, a description will be given of a second embodiment of the image input apparatus according to the present invention, by referring to FIG. 7. In this embodiment, the present invention is applied to an electronic still camera. FIGS. 8A and 8B are flow charts for explaining an operation of a system controller shown in FIG. 7. In FIG. 7, those parts which are essentially the same as those corresponding parts in FIG. 3 are designated by the same reference numerals, and a description thereof will be omitted.

The image input apparatus shown in FIG. 7 includes a camera part 31, an adapter part 32, a memory 33, an output terminal 34, the switching circuit 18, the operation part 19 and the motor controller 24. The memory 33 corresponds to the storage device 25 shown in FIG. 3. In the automatic focusing mode, the switching circuit 18 supplies to the operation part 19 the high-frequency component of the image signals which are received from compression and expansion parts 47 and 48 of the camera part 31. When the switching circuit 18 is set to the image storage mode by an interrupt of the image storage request, the switching circuit 18 connects to the memory 33 immediately before the image storage so as to store the low-frequency component of the image signals which are received from the compression and expansion parts 47 and 48. The operation part 19 carries out an operation to obtain the focal information which indicates the focus state of image pickup system (35, 37 and 38) based on the image signal which is received from the switching circuit 18. The motor controller 24 drives the motor (not shown) based on the focal information which is received from the operation part 19, so as to move a lens 37 and adjust a focal point of an image pickup device 31 to the in-focus position.

The image pickup device 35 is made up of solid state image sensors such as charged coupled devices (CCDs). A switch 30 is used to turn ON/OFF the power source to the system and switches the system to the image pickup or the image reproduction. When making the image pickup, a system controller 46 controls a driving part 36 in response to a signal from the switch 30 and drives the image pickup device 35. The image pickup device 35 picks up the image of an object via the lens 37 and a shutter 38 and subjects the picked up image to a photoelectric conversion so as to output an analog image signal when driven by the driving part 36. This analog image signal is supplied to a signal processing part 39 and is subjected to a signal processing including a gamma correction, an edge emphasis and the like. The signal processing part 39 converts the analog image signal into a luminance signal Y and color difference signals R-Y and B-Y.

The luminance signal Y is passed through an A/D converter 40 and is developed into one frame (picture) in a page memory 42 by an operation of a memory controller 41. The color difference signals R-Y and B-Y from the signal processing part 39 are switched by a multiplexer 43, passed through an A/D converter 44 and is developed into one frame (picture) in a page memory 45. In this case, the color difference signals R-Y and B-Y are sampled at one-half the sampling rate of the luminance signal Y and is subjected to the A/D conversion in the A/D converter 44 in dot sequence. The memory controller 41 controls the page memories 42 and 45 and the memory 33 based on a control signal from the system controller 46.

A compact liquid crystal display (LCD) device 49, an input key 50 and a data input interface 51 are used for inputting the operator of the camera, the location of the image pickup and the like. For example, the operator's initials and a code (postal code and area code of telephone number) which indicates the location of the image pickup are input from the input key 50 via the interface 51. The LCD device 49 displays the time and date of a digital clock 52 and the input data. The LCD device 49 makes a 6-digit display using numbers "0" to "9" and alphabets "A" to "Z" and "a" to "z".

Figure 9A:
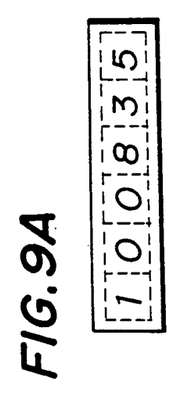
FIGS. 9A through 9F are diagrams for explaining an operation of an input key and a display on a LCD device.
Figure 9B:
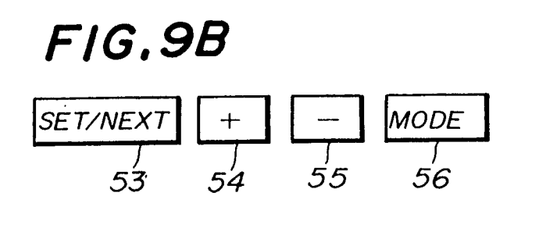

The 6 digits of the LCD device 49 are controlled by four buttons 53 through 56 of the input key 50 as shown in FIG. 9B inputting the data for making a search. The four buttons 53 through 56 are controlled similarly to a digital clock on the market. In other words, a "SET/-NEXT" button 53 starts and sets the change of the display data on the LCD device 49. A "+" button 54 successively changes the character of the display data in an increasing direction. For example, when the character of the display data is the number "2", this number is increased to "3" when the "+" button 54 is pushed once, and the number is thereafter incremented with every push of the "+" button 54. A "−" button 55 successively changes the character of the display data in a decreasing direction. For example, when the character of the display data is the number "5", this number is decreased to "4" when the "−" button 55 is pushed once, and the number is thereafter decremented with every push of the "−" button 55. A "MODE" button 56 changes the mode of the display data of the LCD device 49. For example, the display data on the LCD device 49 successively changes to the date, the time, the operator, the postal code of the location, the area code of the telephone number of the location, and the like every time the "MODE" button 56 is pushed once.

In actual use, the "MODE" button 56 is pushed to display the desired mode on the LCD device 49, and the "SET/NEXT" button 53 is then pushed. As a result, a leftmost character of the display data on the LCD device 49 blinks. In order to change this leftmost character, the "+" button 54 or the "−" button 55 is pushed to display a desired character and the "SET/NEXT" button 53 is then pushed. Then, a second leftmost character of the display data on the LCD device 49 blinks, and a similar change can be made for this second leftmost character. The character change ends when the last character of the display data on the LCD device 49 is set and the "SET/NEXT" button 53 is pushed.

Figure 9C:
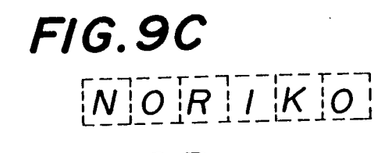
Figure 9D:
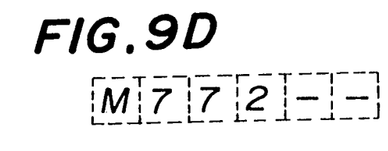
Figure 9E:
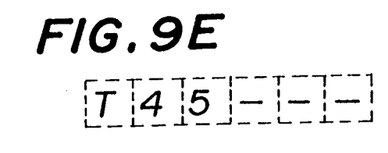

FIG. 9A and 9C through 9E show examples of the display data on the LCD device 49. FIG. 9A shows the time "10:08 and 35 seconds". FIG. 9C shows the operator's name "NORIKO". FIG. 9D shows the postal code "772" of the location, where "M" indicates that the data relates to the postal code. FIG. 9E shows the area code "45" of the telephone number of the location, where "T" indicates that the data relates to the area code of the telephone number.

At the time of the reproduction when the characters in correspondence with the data which are used for the search are displayed on the LCD device 49, the sequence controller 46 controls a character generator 57 to generate raster data to be transferred to the page memory.

When a shutter button is squeezed and the switch 30 is switched to the side for image pickup, the system controller 46 controls the memory controller 41 to start writing to the page memories 42 and 45. Data amounting to one frame (picture) is stored in the page memories 42 and 45, and the stored luminance signal Y and the color difference signals R-Y and B-Y are compressed in the compression and expansion parts 47 and 48. The compressed data are stored in the memory 33 via the switching circuit 18 together with the data from the character generator 57 for use in making the search and the date and time information from the clock 52. Accordingly, the data for use in making the search and the date and time information are added as image data to each of the frames (pictures) stored in the memory 33.

Figure 10:
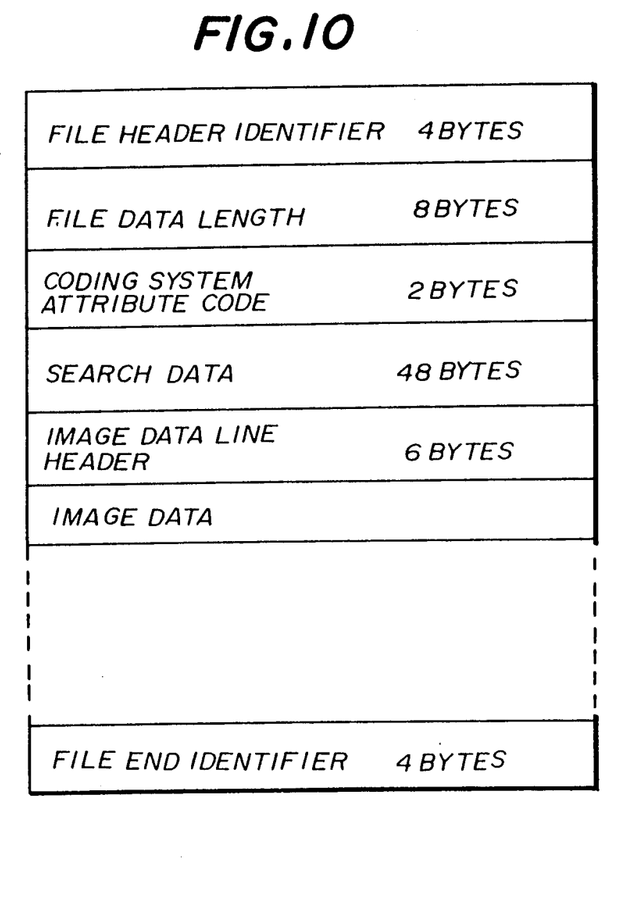
FIG. 10 shows a data format of data stored in a memory.

FIG. 10 shows a data format of the data stored in the memory 33. In FIG. 10, a file header identifier indicates a beginning of an image data file, and a file data length indicates the number of bytes of the image data file. A coding system attribute code indicates whether or not the image data is compressed, and indicates the compression system if in the affirmative. A search data includes the data for use in making the search and the date and time information. An image data line header is an identifier of the image in lines or blocks, and the image data is stored immediately after the image data line header. A file end identifier indicates the end of the image data file.

At the time of the reproduction, the system controller 46 controls the memory controller 41 to read out the image data amounting to one file from the memory 33 via the switching circuit 18. The read out image data is expanded in the compression and expansion parts 47 and 48 and is developed in the page memories 42 and 45.

Figure 9F:
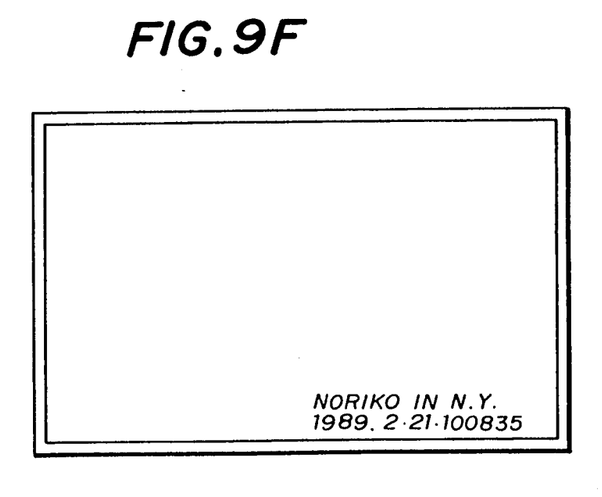

The developed image data is transferred to the adapter part 32. The adapter part 32 subjects the image data from the page memories 42 and 45, that is, the luminance signal Y and the color difference signals R-Y and B-Y, to a D/A conversion in respective D/A converters 58, 59 and 60. Output analog signals of the D/A converters 58, 59 and 60 are supplied to an NTSC system encoder 61 which converts the incoming signals into a video signal which is in conformance with the NTSC system. The output video signal of the NTSC system encoder 61 is output from an output terminal 34 and supplied to a television monitor (not shown) or the like. The television monitor or the like reproduces the image from the video signal, and an image shown in FIG. 9F is reduced, for example. In FIG. 9F, the data for use in making the search and the date and time information are displayed together with the original image.

Next, the image pickup operation and the reproducing operation will be summarized with reference to FIGS. 8A and 8B.

FIG. 8A is a flow chart for explaining the image pickup operation. A step S41 discriminates whether or not the shutter button is squeezed. When the discrimination result in the step S41 is YES, a step S42 instructs the memory controller 41 to start developing the image data amounting to one frame (page) in the page memories 42 and 45, and to store the data for use in making the search and the date and time information in the memory 33. A step S43 instructs the start of the image data compression in the compression and expansion parts 47 and 48. A step S45 makes the data transfer by storing the file information in the memory 33.

FIG. 8B is a flow chart for explaining the reproducing operation. A step S51 reads the file header information from the memory 33. A step S52 carries out the data transfer control, by transferring the compressed image data from the memory 33 to the compression and expansion parts 47 and 48 to make the expansion and transferring the expanded image data to the adapter part 32 via the page memories 42 and 45.

In a modification of this embodiment, an electronic finder may be provided to display the inside of the page memories 42 and 45. In this case, it becomes possible to monitor the data for use in making the search via the electronic finder. In addition, the LCD device 49 may be replaced by the electronic finder.

Figure 11:
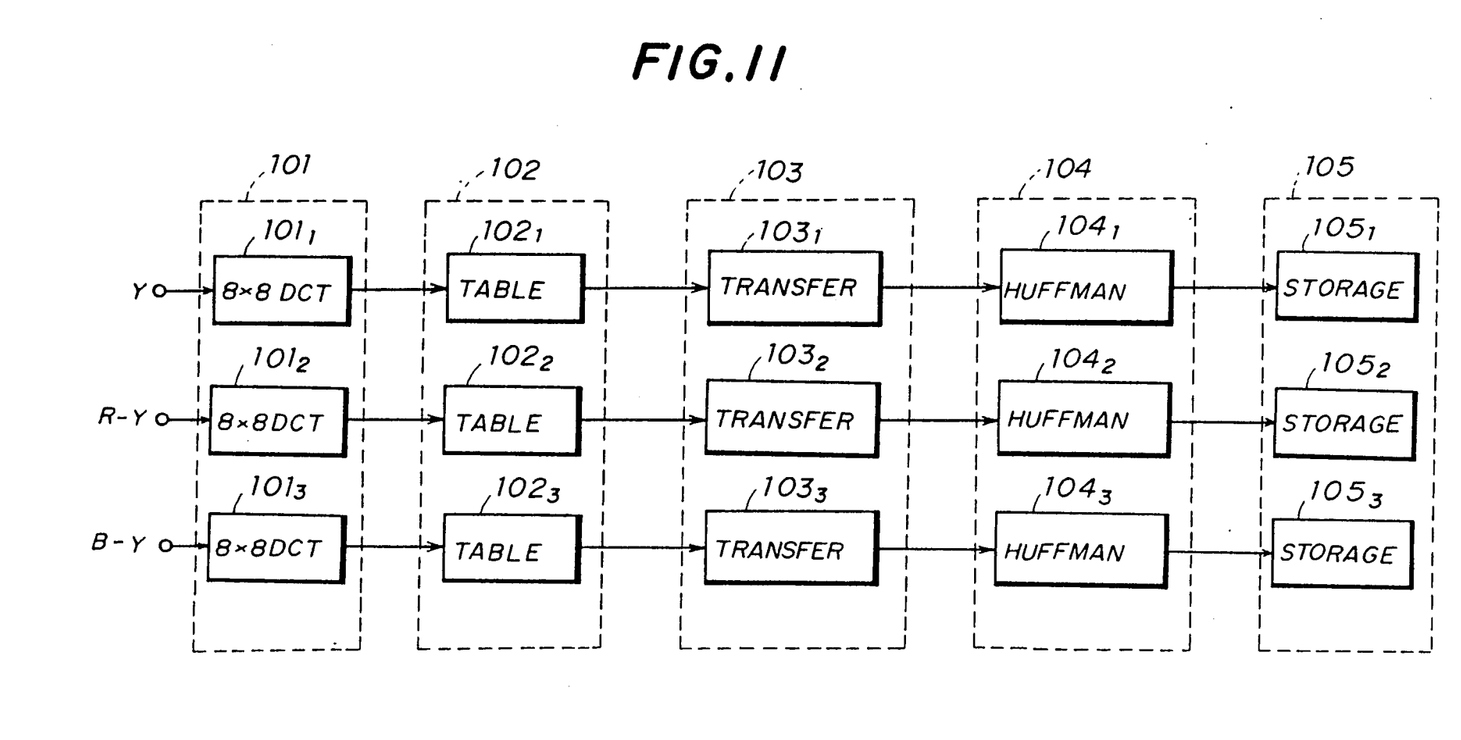
FIG. 11 is a system block diagram showing an embodiment of a compression part of a compression and expansion part.

Next, a description will be given of an embodiment of the compression and expansion parts 47 and 48. FIG. 11 shows an embodiment of a compression part of the compression and expansion part 47 or 48, and FIG. 12 shows an embodiment of an expansion part of the compression and expansion part 47 or 48.

In FIG. 11, the compression part generally includes a discrete cosine transform (DCT) part 101, an operation part 102, a data transfer part 103, a Huffman coding part 104 and a storage part 105. The DCT part 101 has a DCT circuit $101_1$ which receives the luminance signal from the page memory 42, and DCT circuits $101_2$ and $101_3$ which receive the color difference signals R-Y and B-Y from the page memory 45. The operation part 102 has quantization tables $102_1$ through $102_3$ in correspondence with the DCT circuits $101_1$ through $101_3$ of the DCT part 101, and carries out an operation (division) using the quantization tables $102_1$ through $102_3$. Outputs of the quantization tables $102_1$ through $102_3$ are supplied to corresponding transfer circuits $103_1$ through $103_3$ of the data transfer part 103 which transfers the data in the zigzag scan sequence. The data from the data transfer part 103 are coded in the Huffman coding part 104 in conformance with the Huffman coding. Coded (compressed) data from coders $104_1$ through $104_3$ of the Huffman coding part 104 are supplied to corresponding storages $105_1$ through $105_3$ of the storage part 105.

Figure 12:
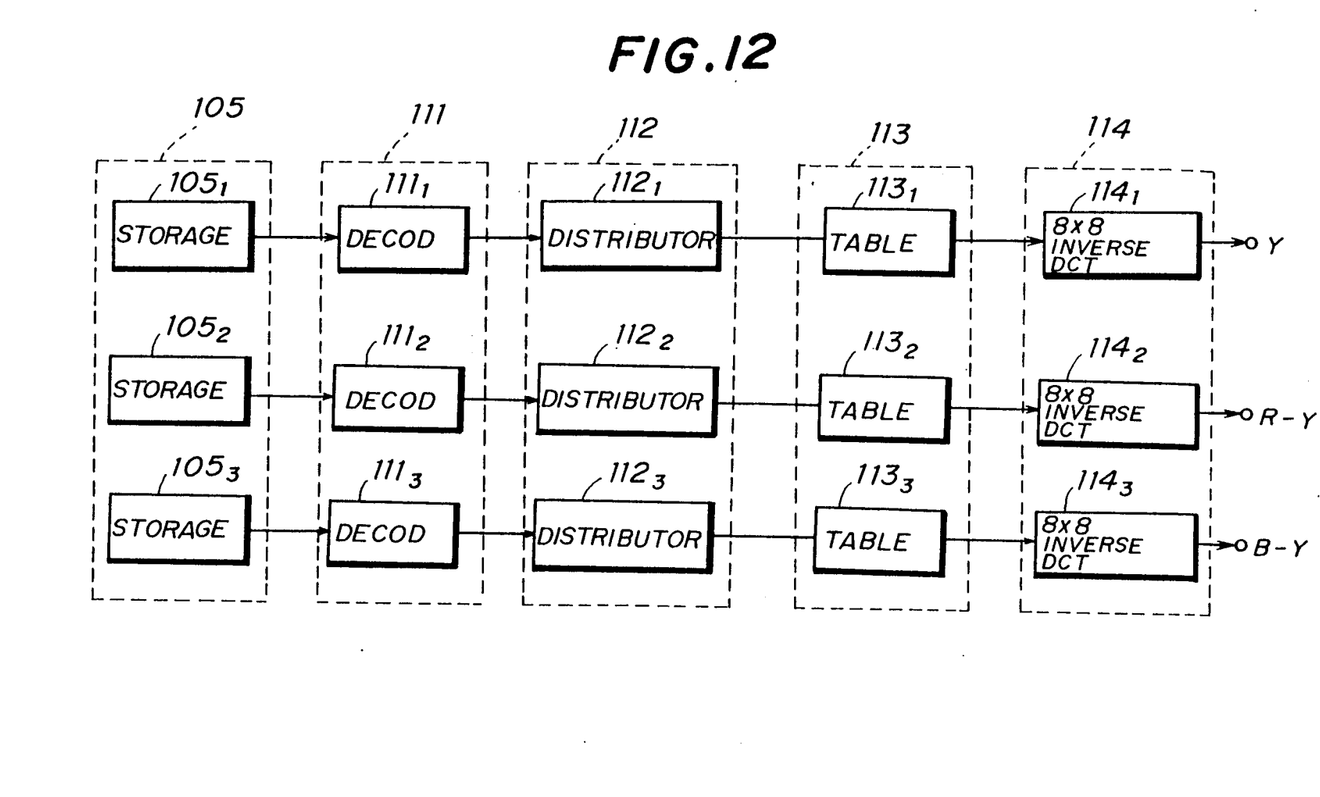
FIG. 12 is a system block diagram showing an embodiment of an expansion part of the compression and expansion part.

In FIG. 12, the expansion part generally includes the storage part 105, a Huffman decoding part 111, a distributing part 112, an operation part 113 and an inverse DCT part 114. The data read out from the storages $105_1$ through $105_3$ of the storage part are supplied to corresponding decoders $111_1$ through $111_3$ of the Huffman decoding part 111. The decoded data from the Huffman decoding part 111 are supplied to corresponding distributors $112_1$ through $112_3$ of the distributing part 112 which distributes the decoded data into DCT coefficients. The data from the distributing part 112 are supplied to corresponding quantization tables $113_1$ through $113_3$ of the operation part 113 which carries out an operation (multiplication) using the quantization tables $113_1$ through $113_3$. The data from the operation part 113 are supplied to corresponding inverse DCT circuits $114_1$ through $114_3$ of the inverse DCT part 114, and the expanded luminance signal Y and color difference signals R-Y and B-Y are supplied to the page memories 42 and 45 and developed therein.

Further, the present invention is not limited to these embodiments, but various variations and modifications may be made without departing from the scope of the present invention.

What is claimed is:

1. An automatic focusing system comprising:
   an image pickup system for picking up an image and for outputting an image signal;
   compression means for digitally compressing the image signal from said image pickup system and for outputting a compressed image signal;
   operation means for obtaining focal information by carrying out a digital operation on the compressed image signal; and
   adjusting means responsive to the focal information for automatically adjusting a focal point of said image pickup system to an in-focus position.

2. The automatic focusing system as claimed in claim 1 wherein said compression means compresses the image signal in conformance with a discrete cosine transform.

3. The automatic focusing system as claimed in claim 1 wherein said compression means compresses the image signal in conformance with an adaptive discrete cosine transform.

4. The automatic focusing system as claimed in claim 1 wherein said operation means obtains said focal information based on a high-frequency component of the compressed image signal.

5. The automatic focusing system as claimed in claim 1 wherein said compression means includes signal processing means for subjecting the image signal to a predetermined signal processing and coding part for coding an output of said signal processing means to produce said compressed image signal.

6. An image input apparatus having an automatic focusing system, said image input apparatus comprising:
   an image pickup system for picking up an image and for outputting an image signal;
   compression means for digitally compressing the image signal from said image pickup system and for outputting a compressed image signal;

switching means for outputting a high-frequency component of the compressed image signal in a first mode and for outputting a low-frequency component of the compressed image signal in a second mode;

operation means for obtaining focal information by carrying out a digital operation on the compressed image signal including the high-frequency component from the switching means in the first mode;

adjusting means responsive to the focal information for automatically adjusting a focal point of said image pickup system to an in-focus position; and transfer means for transferring the compressed image data including the low-frequency component from said switching means in the second mode, said image pickup system, said compression means, said operation means and said adjusting means forming said automatic focusing system.

7. The image input apparatus as claimed in claim 6 wherein said first mode is an automatic focusing mode and said second mode is a storage mode, said transfer means including a memory for storing the compressed image data including the low-frequency component from said switching means in the second mode.

8. The image input apparatus as claimed in claim 6 wherein said first mode is an automatic focusing mode and said second mode is a transmission mode, said transfer means including means for transmitting the compressed image data including the low-frequency component from said switching means in the second mode.

9. The image input apparatus as claimed in claim 6 wherein said compression means compresses the image signal in conformance with a discrete cosine transform.

10. The image input apparatus as claimed in claim 6 wherein said compression means compresses the image signal in conformance with an adaptive discrete cosine transform.

11. The image input apparatus as claimed in claim 6 wherein said operation means obtains said focal information based on the high-frequency component of the compressed image signal.

12. The image input apparatus as claimed in claim 6 wherein said compression means includes signal processing means for subjecting the image signal to a predetermined signal processing and coding part for coding an output of said signal processing means to produce said compressed image signal.

13. The image input apparatus as claimed in claim 6 which further comprises adding means coupled to said compression means for adding additional information to the compressed image signal from said compression means.

14. The image input apparatus as claimed in claim 13 wherein said transfer means includes a memory for storing said additional information together with the compressed image data including the low-frequency component from said switching means in the second mode.

15. The image input apparatus as claimed in claim 13 wherein said additional information includes data for use in making a search and date and time information which are related to the image picked up by said image pickup system.

* * * * *